United States Patent [19]
Akeley

[11] Patent Number: 5,369,739
[45] Date of Patent: Nov. 29, 1994

[54] APPARATUS AND METHOD FOR GENERATING POINT SAMPLE MASKS IN A GRAPHICS DISPLAY SYSTEM

[75] Inventor: Kurt Akeley, Mountain View, Calif.

[73] Assignee: Silicon Graphics, Inc., Mountain View, Calif.

[21] Appl. No.: 89,715

[22] Filed: Jul. 9, 1993

[51] Int. Cl.$^5$ ............................................. G06F 15/62
[52] U.S. Cl. ..................................................... 395/134
[58] Field of Search ............... 395/133, 135, 134, 162, 395/164, 165, 166; 345/118, 119, 120

[56] References Cited

U.S. PATENT DOCUMENTS 4,692,468  10/1990  Beauregard et al. ............... 364/521
5,268,992  12/1993  Sasaki .................................. 395/110

*Primary Examiner*—Phu K. Nguyen
*Attorney, Agent, or Firm*—Blakely, Sokoloff, Taylor & Zafman

[57] ABSTRACT

In a computer graphics system, a method of generating a geometrically valid point sample mask corresponding to a pixel. A separate mask is generated for each edge of a polygon. These masks specify whether particular subsample points are within a half-plane defined by an edge of the polygon. This information is determined by examining the sign of vertical or horizontal distance metrics corresponding to those sample points. These separate masks are merged to form the final point sample mask. Thereby, the final point sample mask contains information specifying whether particular sample points reside within the polygon. This information is used in rendering the pixel for display by the computer graphics system.

26 Claims, 12 Drawing Sheets

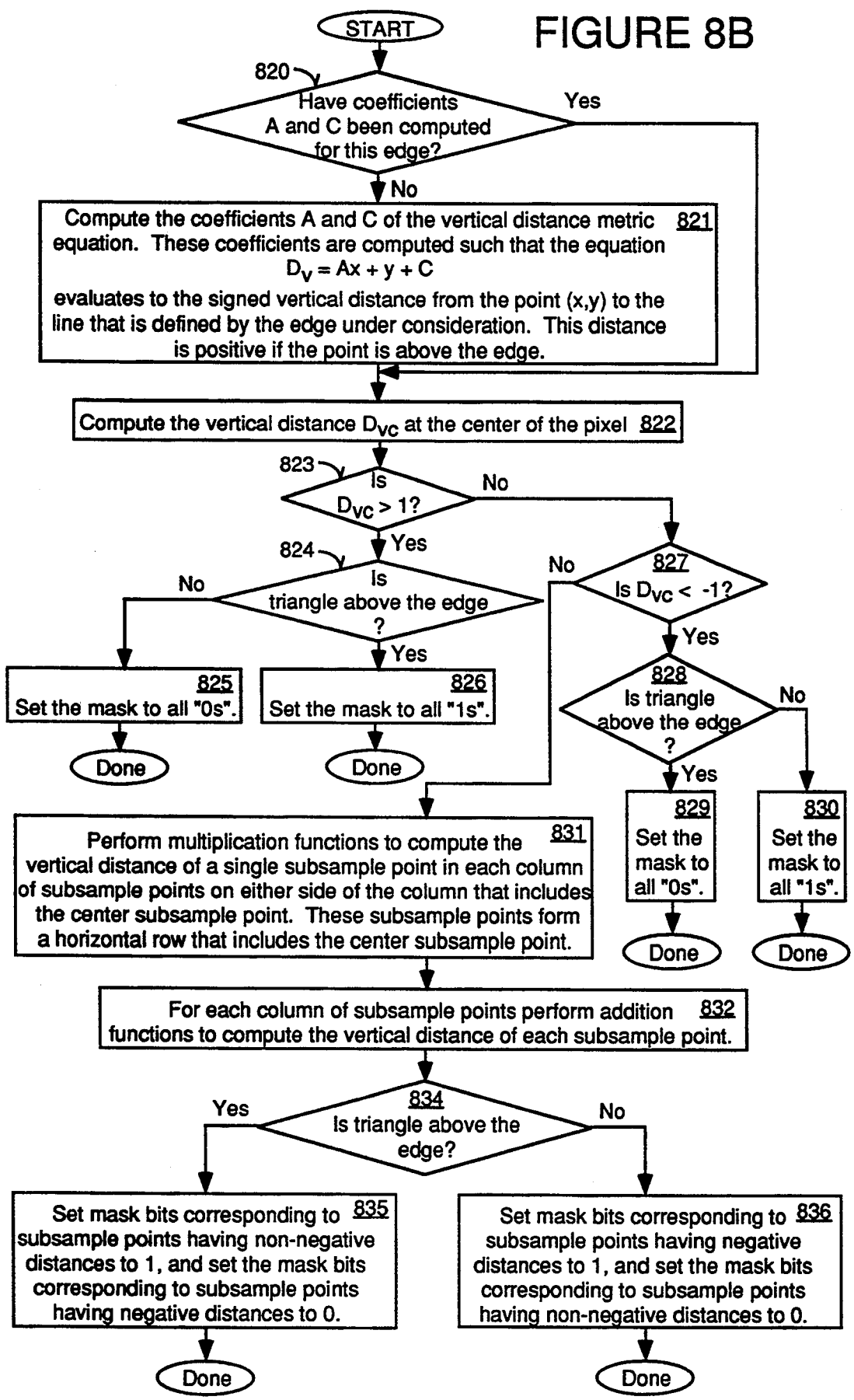

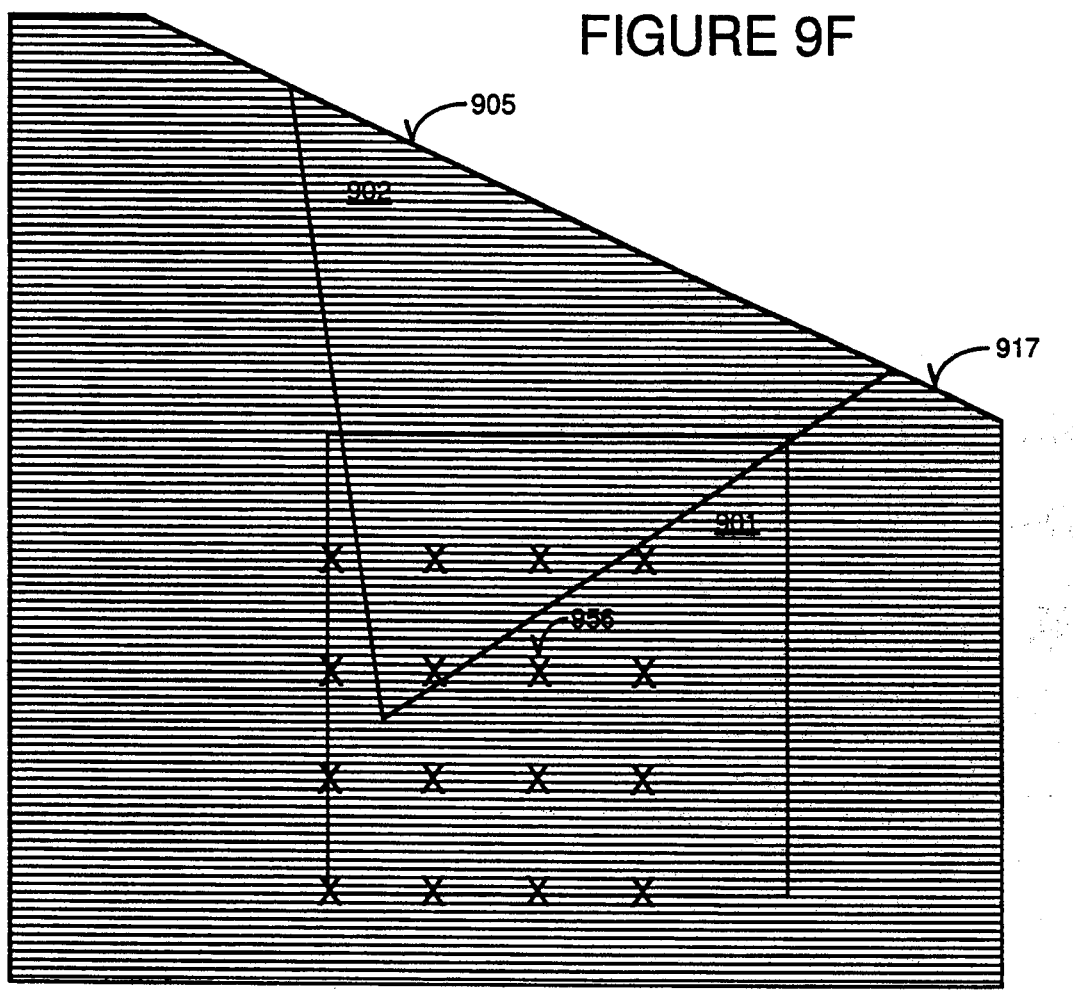
FIGURE 9F
FIGURE 9G
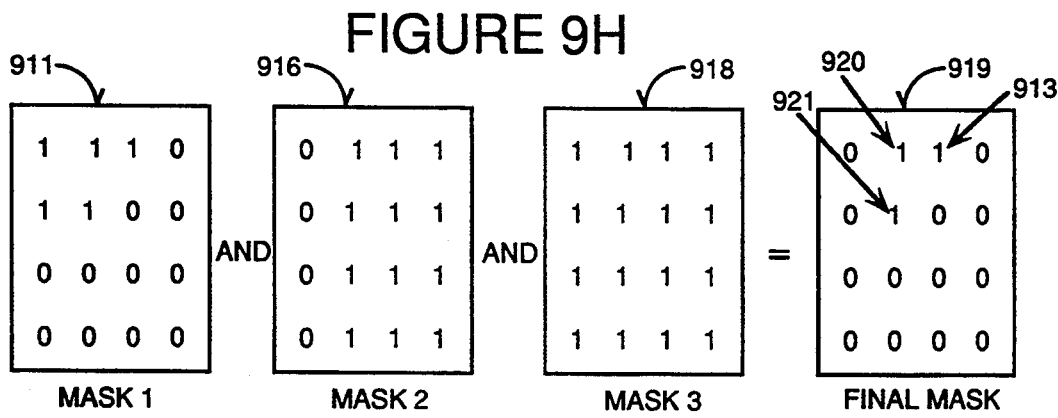
FIGURE 9H

APPARATUS AND METHOD FOR GENERATING POINT SAMPLE MASKS IN A GRAPHICS DISPLAY SYSTEM

FIELD OF THE INVENTION

The present invention pertains to the field of computer graphics display systems. More particularly, the present invention relates to an apparatus and method for generating point sample masks for pixels in a computer graphics display system.

BACKGROUND OF THE INVENTION

One area in which computers are finding increased usage is in that of the graphical arts. Advances in speed, processing power, and memory capacity together with lower costs, have made computer graphics systems suited for simulating and displaying models of concrete or abstract objects. Moreover, computer generated models give users the capability to visualize and comprehend the structure of a single object and also the interaction and relationships between a group of objects. Furthermore, interactive computer graphics allows a user to input changes to a display. These changes are effectuated by the computer, which displays the resulting, modified images. For example, interactive computer graphics are being applied to video games, flight simulators, medical diagnostic displays, animated picture generators, computer-aided design, etc.

Basically, the display screens upon which computer-generated images are shown, are comprised of an array of picture elements. These picture elements are commonly referred to as "pixels". Each pixel represents a dot on the screen. Each of these pixels has associated parameter values which define certain attributes such as intensity, color (RGB), depth (Z), and blending (Alpha) for that particular pixel. The computer assigns parameter values for each pixel of the display screen for producing desired images. The parameter values are rendered into frame buffers, which are later read out for display. The aggregate of thousands of such pixels so programmed are used to represent physically displayed images on the display screen.

In order to simplify and increase the speed of the rendering and display process, complex or three-dimensional images are broken down into simple polygons, known as "primitives". It is easier and faster to rasterize whole polygons versus rasterization on a per pixel basis. Rasterization of primitives entails determining which pixels are to be updated for rendering that particular primitive. Additionally, rasterization involves the determination of how those pixels should be updated for creating a visually accurate display.

Primitives can take the shape of any of the polygons. For the sake of clarity, a triangular primitive is described herein. There exist many prior art techniques for determining which of the pixels of a triangular primitive should be modified for rendering that primitive. One such prior art technique involves "walking" along the edges of the triangle and generating horizontal or vertical spans of pixels from one edge to an opposing edge of the triangle.

Another prior art technique treats the triangle as the intersection of three half-planes. Each edge of the triangle is considered as an edge of one of the half-planes. Those pixels which fall "inside" each of the three half-planes are considered to be inside the triangle and are rendered. Pixels falling "outside" one or more of the half-planes are considered to be outside of the triangle and are not rendered.

The quality of the resulting images is improved if special attention is directed towards rasterizing those pixels near the borders of the triangle. Because the areas of these border pixels are partially inside and partially outside the boundaries of the triangle, their colors should be modified to reflect the proportion of the actual coverage. One prior art method involved computing an estimate of the pixel coverage. A new "blended" pixel value is generated in proportion to this estimated coverage.

One problem inherent to the coverage approach is that it is not possible to distinguish the effects of two triangles that abut in the vicinity of a pixel versus the effects of two triangles that obscure the same subregion of a pixel. For example, if triangle A covers 35% and triangle B covers 50% of a given pixel, it is not known whether triangle B covers the same 35% as triangle A plus 15%, if the 50% coverage of triage B is totally different from the 35% coverage of triangle A, or if the coverage falls somewhere in-between. Moreover, scalar coverages are difficult to merge correctly near the vertices of a single triangle, where the coverage values of two edges interact.

A better prior art technique for handling border pixels involves utilizing a mask. The mask is comprised of a number of bits corresponding to specific subregions of a pixel. The number of bits in a mask matches the actual area of half-plane coverage, often to a resolution of ± half a bit. For example, if the half-plane covers 52% of the pixel, and the mask is comprised of a total of 16 bits, then 8 or 9 of the bits are set while 7 or 8 bits are cleared. Those bits whose subregions most closely correspond to the pixel area that is covered by the half-plane are selected to be set. The bits are set and cleared independent of the orientation of the edge to the pixel.

However, problems arise due to the fact that typical mask generation techniques produce a mask that is based on an area of coverage, rather than precise evaluations at well defined points. Hence, area-based masks are often incompatible with existing z-buffering schemes (Z values stored in Z buffers correspond to the relative "depths" of display for eliminating "hidden" surfaces). In most cases, the Z values stored in the Z buffer can represent depth only for an exact point, rather than for an area of coverage. Applying area-based masks to graphics systems having multiple depth and color values for each pixel will sometimes compute inconsistent depth values for some of the subregions.

This problem is especially acute for those subregions whose center falls outside the actual geometry of the triangle. These inconsistent depth values might result in undesirable artifacts in the displayed images. An example of such an artifact is the protrusion of "bulkheads". A bulkhead is that part of a triangle that exactly abuts the interior of some other triangle. Hence, that part should not be visible since it is hidden behind the other triangle. Such bulkheads are improperly factored in the display if the mask generator is based on an area of coverage, whereas each subregion is treated as an exact location by the depth buffer computations.

Thus, there is a need in the computer graphics art for a rasterization process having a mask generator capable of point sampling. Point sampling treats each subregion of a pixel as a single sample point in order to achieve geometric accuracy. It would be preferable if such a mask generator could take advantage of rescaling, reduced-precision arithmetic, and table lookups for achieving an efficient implementation.

SUMMARY OF THE INVENTION

The present invention pertains to the process of generating geometrically valid point-sample masks for rendering primitives in computer graphics systems. The masks are generated to determine whether specific points of a pixel are inside or outside of a polygon. A mask is comprised of an NxM array of subsample points. There is a mask associated with each pixel of interest. For each polygon to be rendered, the corresponding masks are computed to determine how pixels associated with that polygon are to be modified.

In the present invention, a number of masks are generated for each pixel, one for each edge of the polygon. These separate masks are merged to produce a final mask which specifies whether specific subsample points of that pixel are inside or outside of that polygon.

In generating a mask, a determination is made as to whether the slope of the corresponding edge is within the range of $-1$ to $+1$. If the slope does fall within that range, the coefficients of a vertical distance metric equation are computed. These coefficients are computed to evaluate the signed vertical distance from one of the polygon's edges to a particular point of interest.

In the currently preferred embodiment, the pixel is tested to determine whether it falls completely on one side of an edge of the polygon. This is accomplished by testing the vertical distance metric for the center of the pixel. If it can't be determined whether the pixel is intersected by the edge by analyzing the vertical distance metric of the pixel center, then the vertical distance metrics of subsample points on either side of an initial subsample point are computed by performing multiplication functions. These subsample points form a horizontal row that includes the initial subsample point. Next, the vertical distance metrics for a column of subsample points are computed for each of the subsample points of the row by performing addition functions. Thereupon, inside/outside status for each of the NxM subsample points of the mask are determined by examining the sign of their respective vertical distance metrics.

If the slope does not fall within the range $-1$ to $+1$, the coefficients of a horizontal distance metric equation are computed. These coefficients are computed to evaluate the signed horizontal distance from one of the polygon's edges to a particular point of interest.

In the currently preferred embodiment, the pixel is tested to determine whether it falls completely on one side of an edge of the polygon. This is accomplished by testing the horizontal distance metric for the center of the pixel. If it can't be determined whether the pixel is intersected by the edge by analyzing the horizontal distance metric of the pixel center, then the horizontal distance metrics of subsample points above or below an initial subsample point are computed by performing multiplication functions. These subsample points form a vertical column that includes the initial subsample point. Next, the horizontal distance metrics for a row of subsample points are computed for each of the subsample points of the column by performing addition functions. Thereupon, inside/outside status for each of the NxM subsample points of the mask are determined by examining the sign of their respective horizontal distance metrics.

Once the masks for each edge have been generated, a final mask is generated for that pixel by performing logical AND operations on the separate edge masks. It is this final mask which is used to control the modification of the corresponding pixel in the frame buffer.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8B shows a more detailed flowchart describing the steps for generating point sample masks using vertical distance.

FIG. 9F shows an example of a third edge of a triangle in relation to a point sample mask of a pixel.

FIG. 9G shows a mask generated corresponding to the third edge of the triangle.

FIG. 9H shows an example of the generation of a final point sample mask.

DETAILED DESCRIPTION

An apparatus and method for generating point sample masks in a computer graphics system is described. In the following description, for purposes of explanation, numerous specific details are set forth, such as pixel locations, distances, sample mask points, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention. Furthermore, although the following detailed description makes reference to pixels as being a unit-square, pixels are not limited as such. The present invention is still applicable to pixels which are represented in a host of other forms.

Figure 1:
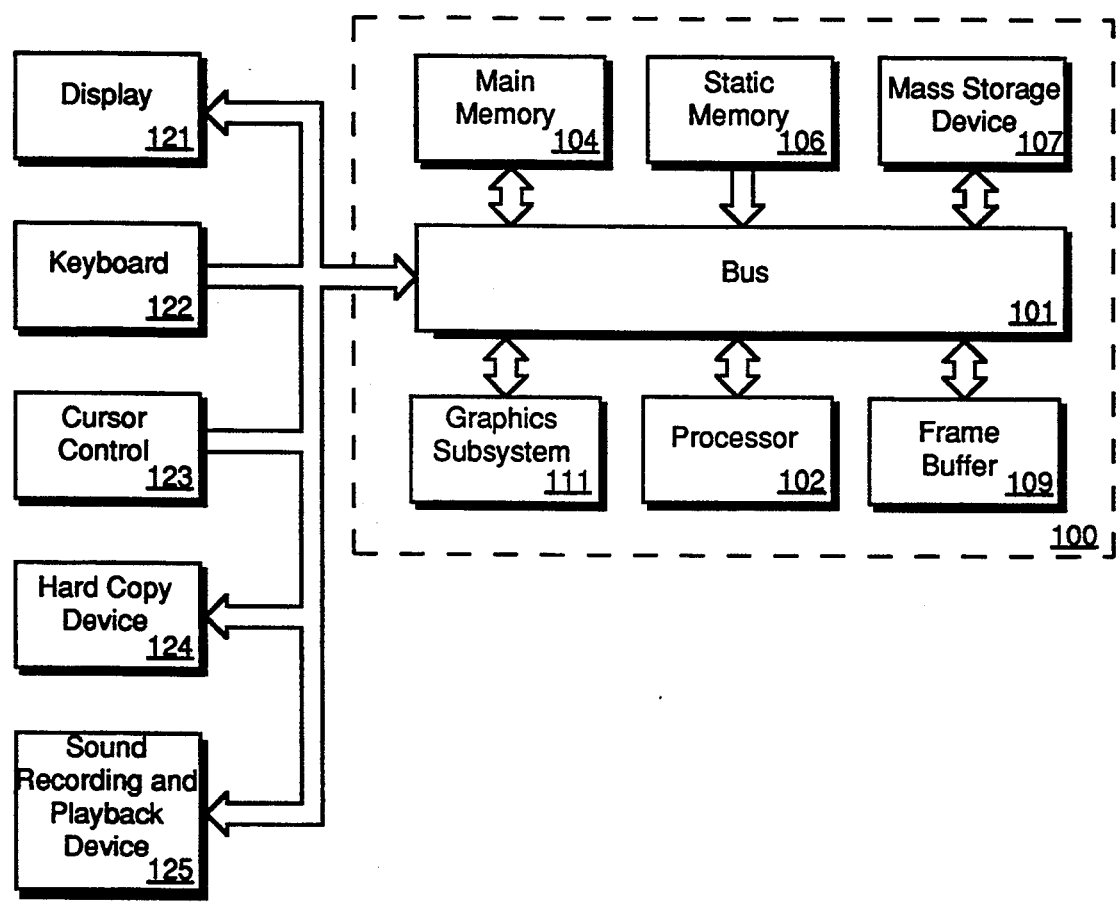
FIG. 1 is a computer graphics system upon which the present invention may be practiced.

Overview of a Computer System Upon Which the Present Invention May Be Implemented Referring to FIG. 1, a computer graphics system upon which the present invention may be practiced is shown as 100. System 100 can include any computer controlled graphics systems for generating complex or three-dimensional images, such as the IRIS ™ family of computers manufactured by Silicon Graphics, Inc. of Mountain View, Calif. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Also coupled to bus 101 is a graphics subsystem 111. Processor 102 provides the graphics subsystem 111 with graphics data such as drawing commands, coordinate vertex data, and other data related to an object's geometric position, color, and surface parameters. The object data is processed by graphics subsystem 111 in the following four pipelined stages: geometry subsystem, scan conversion subsystem, raster subsystem, and a display subsystem. The geometry subsystem converts the graphical data from processor 102 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and anti-aliasing functions are performed. The resulting pixel values are stored in frame buffer 109. The display subsystem reads the frame buffer 109 and displays the image on display monitor 121.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Another device which may be coupled to bus 101 is hard copy device 124 which may be used for printing instructions, data, or other information on a medium such as paper, film, or similar types of media. Additionally, computer system 100 can be coupled to a device for sound recording and/or playback 125, such as an audio digitizer coupled to a microphone for recording information. Further, the device may include a speaker which is coupled to a digital to analog (D/A) converter for playing back the digitized sounds.

Point-Sample Mask Generator

The present invention utilizes a derivative of a prior art algorithm, published by Pineda in SIGGRAPH 1988, pp 17-20. Basically, the Pineda algorithm is used to determine whether a point falls inside or outside of a half-plane. The Pineda algorithm involves computing a value based on an equation for each half-plane edge evaluated for an (x,y) coordinate. The absolute value of the result is proportional to the distance from that point to the nearest point on the edge. The sign of the result indicates which side of the edge, the (x,y) coordinate is on.

Figure 2:
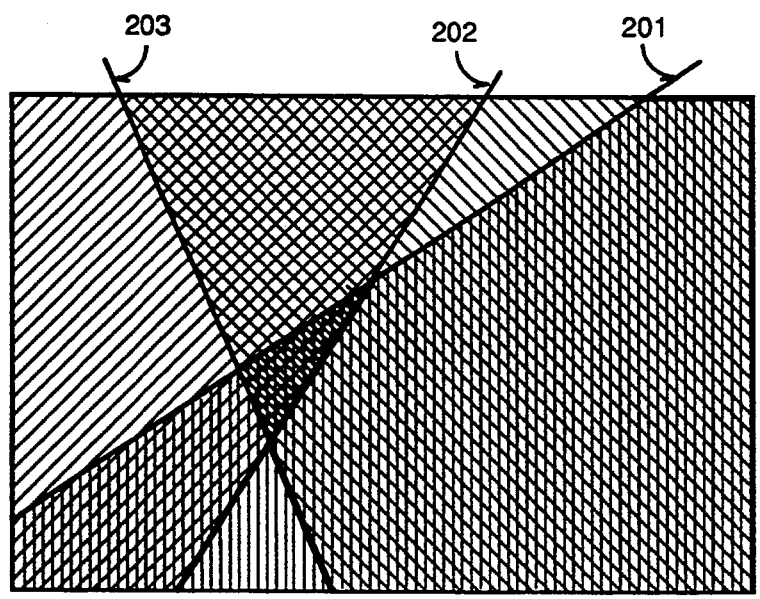
FIG. 2 shows three half-planes whose intersection forms a triangle.

Referring to FIG. 2, the lines 201-203 define three half-planes whose intersection forms a triangle 204. Pineda's equation is:

$$D = Ax + By + C, \text{ where}$$

$$A = y_0 - y_1$$

$$B = x_1 - x_0$$

$$C = x_0 y_1 - x_1 y_0$$

The metric D is proportional to the distance; x,y is the location; and $x_0, y_0$ and $x_1, y_1$ are two different locations on the edge (e.g., the two triangle vertexes that define the edge). Some care is required in interpreting the meaning of the sign of the Pineda distance value.

Thus, one method for generating a point sample mask wherein each pixel subregion is treated as an exact sample point is to perform the Pineda algorithm and to check for the sign of its distance metric D at each of the subsample points. However, this brute force method is quite inefficient. For a 16-bit mask, the Pineda algorithm would necessarily be repeated sixteen times over (i.e., once per each subsample).

Figure 3:
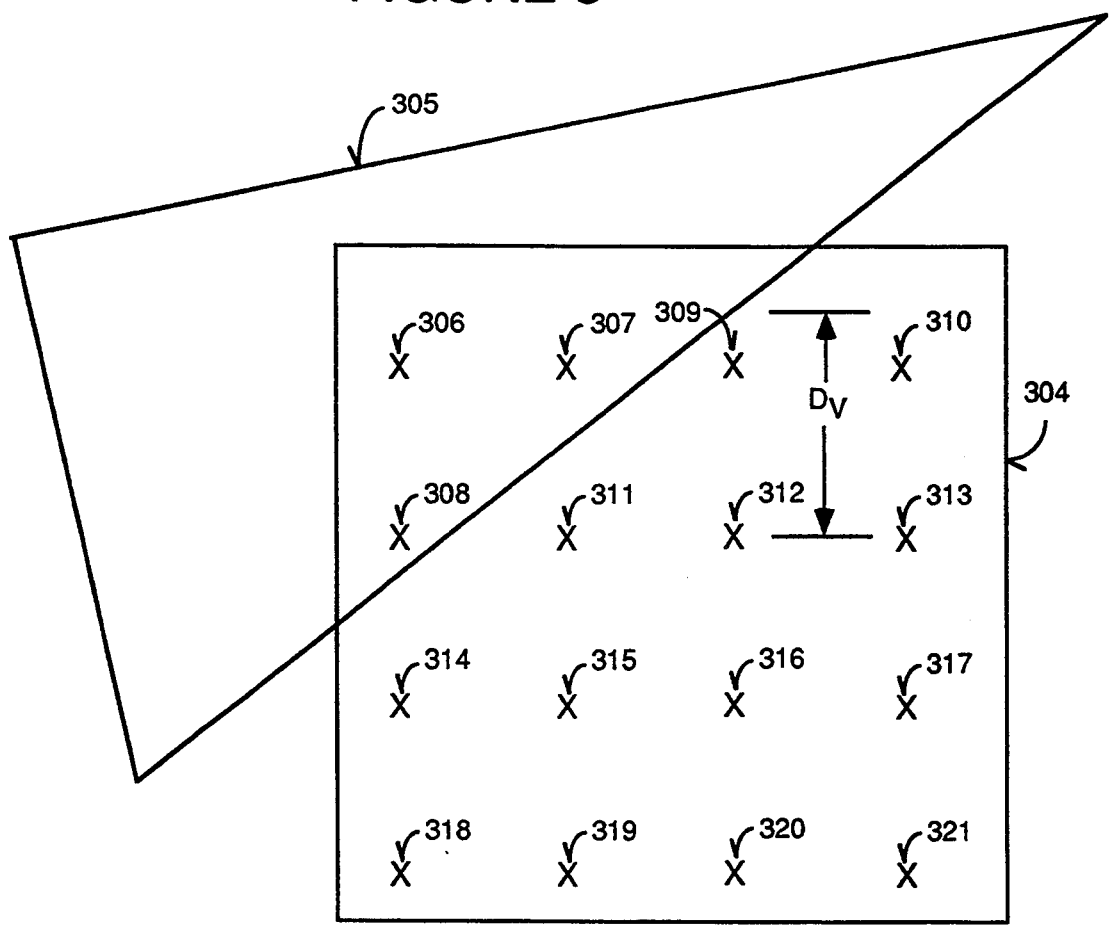
FIG. 3 shows the intersection of a pixel having a regular array of subsample points with a triangular polygon.

The present invention involves a more elegant process for generating the point sample masks. Referring to FIG. 3, a sample mask for pixel 304 which intersects a triangular primitive 305 is shown. In the present invention, the pixel subsample points are arranged in a regular two-dimensional array with respect to the pixel, rather than as arbitrary locations. For example, a 4×4 array of sixteen subsample points 306–321 corresponding to pixel 304 is shown. It can be seen that subsample points 306–308 are inside triangle 305, while subsample points 309–321 are outside of triangle 305.

Given an array of subsample points and a half-plane where the slope of the edge is between [−1,+1], a vertical distance metric $D_v$ is calculated for one of the subsample points (e.g., subsample point 312). The determinations as to whether the other subsample points fall inside or outside the triangle are interpolated from the $D_v$ of that first subsample point as described in detail below.

The present invention normalizes the Pineda equation such that B is equal to one. This is accomplished by dividing A, B, and C by B. The result of this normalization is that the new distance metric $D_v$ now represents the signed vertical distance from the half-plane edge to the location (x,y)—in contrast to the distance from the location perpendicular to the half-plane edge taught by Pineda. This results in the following equations:

$$D_y = Ax + y + C, \text{ where}$$

$$A = (y_0 - y_1)/(x_1 - x_0)$$

$$C = (x_0 y_1 - x_1 y_0)/(x_1 - x_0)$$

Note that only the sign (i.e., + or −) of the distance metric $D_y$ is significant for determining whether a given subsample point is inside or outside a half-plane. Hence, the normalized equation for determining $D_y$ is equivalent to the original Pineda equation for the present purpose. With these coefficients, points above the edge of the half-plane have positive distances, and points below have negative distances. If the half-plane is above the edge, non-negative distance is inside, and negative is outside. Otherwise, this is reversed.

In the present invention, the vertical distance metric $D_y$ is used to interpolate inside/outside status for any subsample point along a vertical path passing through that (x,y) location. For such instances, the new $D_y'$ value for a (x,y') subsample point, which can be located either above or below the original (x,y) location, is given by:

$$\begin{aligned} D_y' &= Ax + y' + C \\ &= Ax + y + (y' - y) + C \\ &= D_y + y' - y \end{aligned}$$

Thus, the inside/outside status for any point above or below the original (x,y) location can be obtained by testing the sign of $D_y'$, where $D_y'$ is equal to $D_y$ plus the signed vertical distance from the original (x,y) location to the new subsample point.

Figure 4:
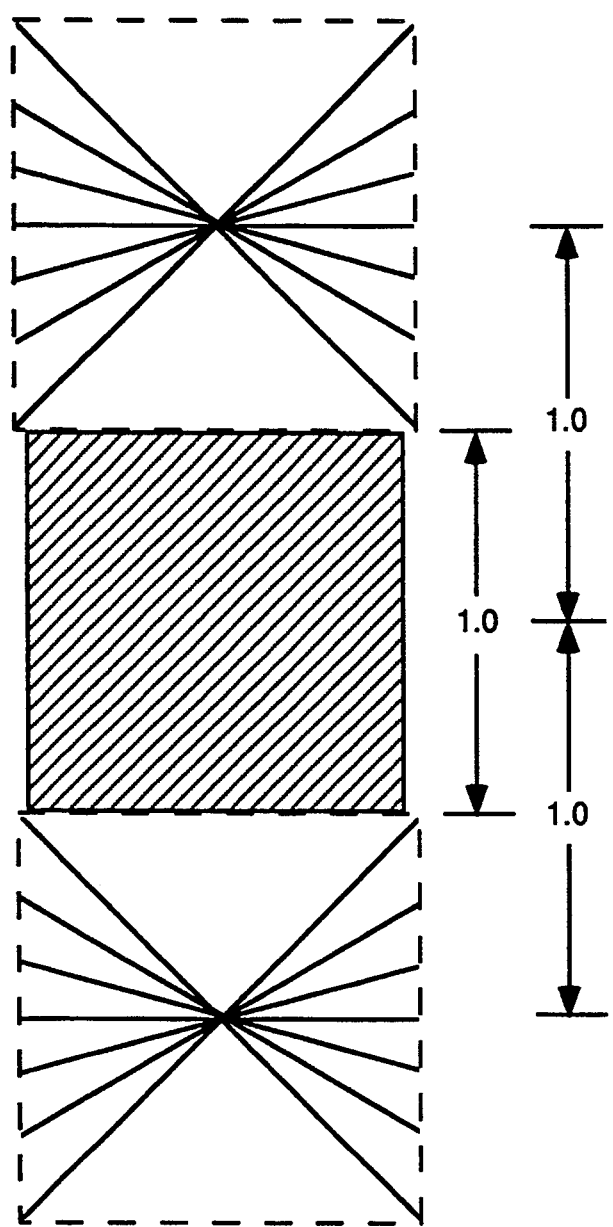
FIG. 4 shows a unit pixel having a vertical distance metric of $+1$ and $-1$ from its center in relation to edges having slopes in the range $[-1, +1]$.

If the vertical distance metric $D_{vc}$ for a sample point at the center of a unit-square pixel is greater than 1 or less than −1, then the edge cannot pass through the pixel, as shown in FIG. 4. Hence, further calculations for subsample positions are not necessary. If $D_{vc}$ for this point is between −1 and +1, then determining the inside/outside status for any point above or below the original (x,y) location, but within the unit-square pixel, involves only simple arithmetic. Note that the initial sample point need not be chosen at the actual center of the pixel. Rather, a sample point whose Δx and Δy are within ±½ to any other sample point will suffice. If no other sample point is located more that ½ pixel away in either the x or y direction, the present invention is unaffected. Even if this requirement is not met, then only the bounds for the test of $D_{vc}$ would have to be changed to reflect this condition.

If it has already been determined that $D_{vc}$ is in the range [−1,+1], the sign of $D_y'$ can be determined using limited-precision arithmetic, given that $D_{vc}$ is represented as a two's complement, fixed point binary value. In the currently preferred embodiment, due to the relatively simple processing for computing $D_y'$ corresponding to fixed locations above and/or below the pixel center, an inexpensive circuit can be implemented to compute $D_y'$ at several such locations.

Figure 5:
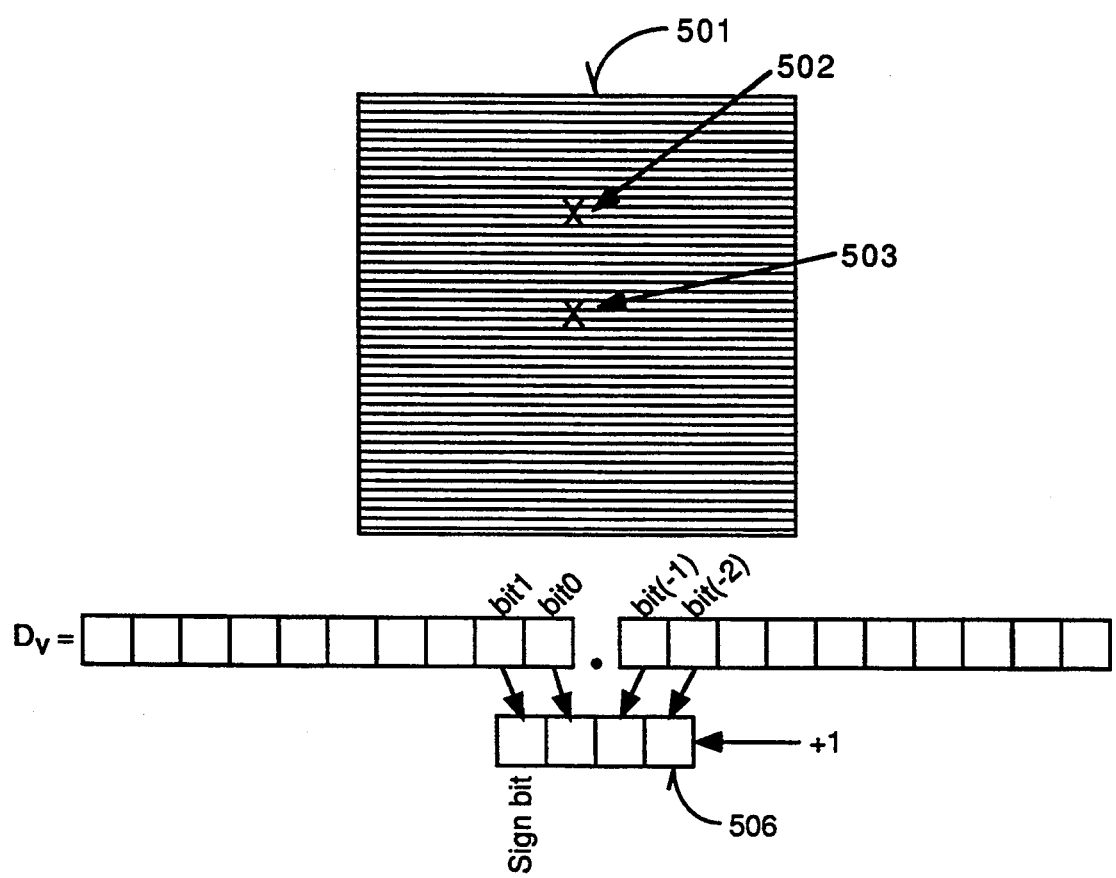
FIG. 5 shows a 4-bit adder which can be implemented to compute vertical distance metrics for a 4×4 array.

For example, FIG. 5 shows an 4-bit adder 506 which can be implemented to compute $D_y'$ for the subsample point 502. Given that subsample point 503 is the center subsample point with a vertical distance metric of $D_{vc}$, subsample point 502 has a $D_y' = D_{vc} + \frac{1}{4}$. For computing Dv' for subsample point 502, a 4-bit adder 506 is required. Bit (−2) corresponds to fractional offsets of ¼. Hence, adding a "1" to the least significant bit of adder 506 effectively adds ¼. The most significant bit of adder 506 (i.e., bit 1) specifies the sign of the resulting Dv'.

Figure 6:
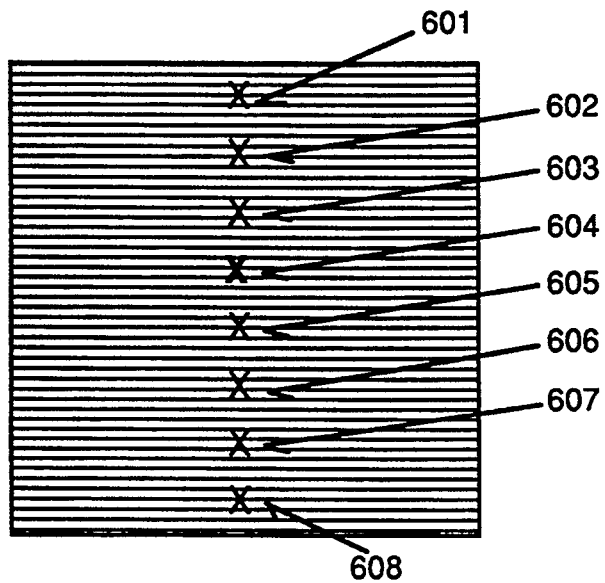
FIG. 6 shows a mask having a column of subsample points.

FIG. 6 shows a column of eight regularly spaced subsample points 601–608 for which inside/outside status can be computed. Simultaneously generating the inside/outside status for these eight subsample points requires thirty-one bits of addition logic. Four five-bit adders are implemented for determining the signs of the vertical metrics corresponding to subsample points 601, 603, 605, and 607. Two four-bit adders are implemented for determining the signs of the vertical metrics corresponding to subsample points 602 and 606. A single three-bit adder is implemented for determining the sign of the vertical metric corresponding to subsample point 608. In general, the number of bits required to compute Dv' is dependent on the fractionality of the offsets (e.g., 3-bit adder for ½ offsets, 4-bit adder for ¼ offsets, 5-bit adder for ⅛ offsets, etc.).

In the present invention, inside/outside status information is also generated for separate columns of regularly spaced sample locations near the pixel center by performing multiplication and addition functions. The distance value for a subsample point directly to the left or right of the pixel center is computed from the following equation:

$$\begin{aligned} D_v'' &= Ax' + y + C \\ &= Ax + A(x' - x) + y + C \\ &= D_v + A(x' - x) \end{aligned}$$

If (x' − x) is constant and can be represented as a fraction with a small denominator (e.g., 2, 4, or 8), the multiplication can be implemented with low precision.

The same addition process described above can be applied to subsamples which are directly above or below the newly computed points to the right and left of the pixel center. Hence, only one multiplication need be performed for an entire column of subsample points.

Figure 7:
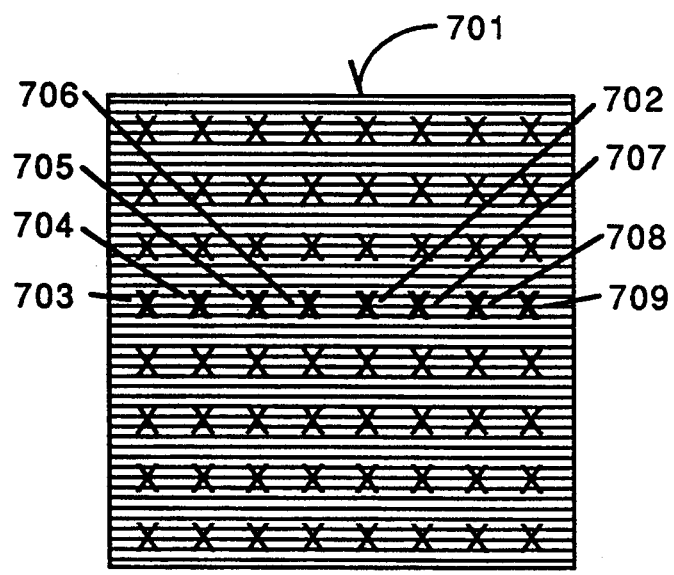
FIG. 7 shows a mask having an 8×8 subsample point array for half-edges with slopes in the range $[-1, +1]$.

FIG. 7 shows an 8×8 sample mask 701 for half-edges having slopes in the range [−1,+1]. The distance metric $D_y$ is calculated for the (x,y) location of the pixel center 702. Next, multiplication is performed as described above to generate the seven subsample points 703–709 to the right and left of center 702. Then, the subsample points are calculated for each of the seven columns 710–716. Thereby, an entire 8×8 array sample mask (i.e., sixty-four subsample points) can be computed simultaneously by implementing seven low-precision multipliers and sixty-three (i.e., 7+7×8) low-precision adders.

Given an array of subsample points and a half-plane where the slope of the edge is not between [−1,+1], a horizontal distance metric $D_h$ is calculated for one of the subsample points. The determinations as to whether the other subsample points fall inside or outside the triangle are interpolated from the $D_h$ of that first subsample point as described in detail below.

The horizontal distance metric equation is given as:

$$D_h = x + By + C, \text{ where}$$

$$B = (x_0 - x_1)/(y_1 - y_0)$$

$$C = ((x_1 * y_0) - (x_0 * y_1))/(y_1 - y_0)$$

Note that only the sign (i.e., + or −) of the distance metric $D_h$ is significant for determining whether a given subsample point is inside or outside a half-plane. With these coefficients, points to the right of the edge of the half-plane have positive distances. If the half-plane is to the right of the edge, non-negative distance is inside, and negative is outside. Otherwise, this is reversed.

In the present invention, the horizontal distance metric $D_h$ is used to interpolate inside/outside status for any subsample point along a horizontal path passing through that (x,y) location. For such instances, the new $D_h'$ value for a (x',y) subsample point, which can be located either to the left or right of the original (x,y) location, is given by:

$$\begin{aligned} D_h' &= x' + By + C \\ &= x + (x' - x) + By + C \\ &= D_h + x' - x \end{aligned}$$

Thus, the inside/outside status for any point to the right or left of the original (x,y) location can be obtained by testing the sign of $D_h'$, where $D_h'$ is equal to $D_h$ plus the signed horizontal distance from the original (x,y) location to the new subsample point.

If the horizontal distance metric $D_{hc}$ for a sample point at the center of a unit-square pixel is greater than 1 or less than −1, then the edge cannot pass through the pixel. Hence, further calculations for subsample points are not necessary. If $D_{hc}$ for this point is between −1 and +1, then determining the inside/outside status for any point to the left or to the right of the original (x,y) location, but within the unit-square pixel, involves only simple arithmetic.

In the present invention, inside/outside status information is also generated for separate rows of regularly spaced sample locations near the pixel center by performing multiplication and addition functions. The distance value for a subsample point directly above or below the pixel center is computed from the following equation:

$$\begin{aligned} D_h'' &= x + By' + C \\ &= x + By + B(y' - y) + C \\ &= D_h + B(y' - y) \end{aligned}$$

If (y'−y) is constant and can be represented as a fraction with a small denominator (e.g., 2, 4, or 8), the multiplication can be implemented with low precision.

The same addition process described above can be applied to subsamples which are directly to the right and left of the newly computed points above and below the pixel center. Hence, only one multiplication need be performed for an entire row of subsample points.

Figure 8A:
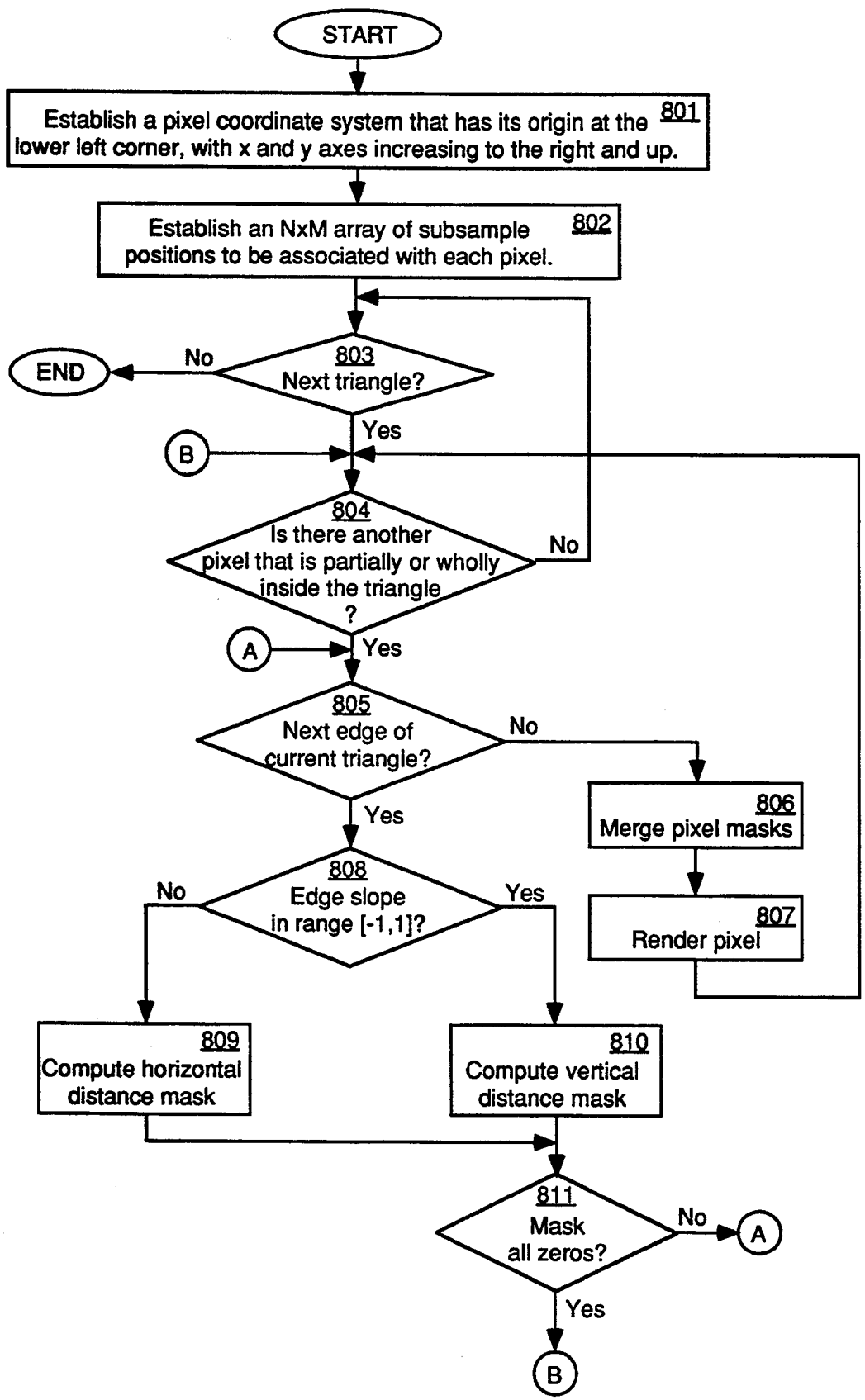
FIG. 8A shows a flowchart describing the steps for generating point sample masks.

FIG. 8A shows a flowchart describing the steps for generating point sample masks. Initially, a pixel coordinate system that has its origin at the lower left corner, with x and y axes increasing to the right and up, is established, step 801. A regular NxM array of subsample points is established for each pixel, step 802.

A determination is made as to whether there is a next triangle, step 803. If not, end flowchart. Otherwise, in step 804, a determination is made as to whether there is another pixel that is partially or wholly in the triangle. If there is not another pixel that is partially or wholly in the triangle, step 803 is repeated. Otherwise, a determination is made as to whether there is a next edge of the triangle, step 805. If there are no more edges, the pixel masks that are computed for each edge are merged, step 806. The resulting pixel is rendered, step 807. And step 804 is repeated.

If step 805 determines that there is a next edge, then a determination is made as to whether the slope of that edge is within the range of [−1, +1], step 808. If the slope is within the range [−1, +1] then the vertical distance mask is computed, step 810. If the slope is not within the range [−1, +1] then the horizontal distance mask is computed, step 809. Following step 809 or 810, step 811 is executed. In step 811, the mask is tested for the all 0's case. If the mask is all 0's, step 804 is repeated. Otherwise, if the mask is not all 0's, step 805 is repeated.

FIG. 8B shows a more detailed flowchart describing the steps for computing a vertical distance mask. In step 820, a determination is made as to whether the coefficients A and C have been computed for the edge under consideration. If not, then the coefficients A and C are computed for the vertical distance metric equation, step 821. These coefficients are computed such that the equation $D_v = Ax + y + C$ evaluates to the signed vertical distance from the point (x,y) to the line that is defined by the edge under consideration. This distance is positive if the point is above the edge. Next, step 822 is executed. If it has been determined in step 820 that these coefficients had previously been calculated for this edge, then step 821 is skipped and the flow proceeds to step 822.

In step 822, the vertical distance $D_{vc}$ is computed for the pixel center. A determination is made in step 823 as to whether $D_{vc}$ is greater than 1. If so, step 824 determines whether the triangle is above the edge. If the triangle is above the edge, the mask is set to all 1's, step 826, and this flowchart is done. If the triangle is not above the edge, the mask is set to all 0's, step 825 and this flowchart is done.

If it is determined in step 823 that $D_{vc}$ is not greater than 1, a determination is then made as to whether $D_{vc}$ is less than −1, step 827. If so, step 828 determines whether the triangle is above the edge. If the triangle is above the edge, the mask is set to all 0's in step 829, and this flowchart is done. If the triangle is not above the edge, the mask is set to all 1's in step 830, and this flowchart is done.

If it is determined in step 827 that $D_{vc}$ is not less than −1, further computations are required to determine which samples are above and which are below the edge. In step 831, multiplication functions are performed to compute the vertical distance of a single subsample point in each column of subsample points on either side of the column that includes the center subsample point. These subsample points form a horizontal row that includes the center subsample point. Next, addition functions are performed to compute the vertical distance of each subsample point for each column of subsample points, step 832.

A determination is made as to whether the triangle is above the edge in step 834. If the triangle is above the edge, step 835 sets the mask bits corresponding to subsample points having non-negative distances to "1". Step 835 also sets the mask bits corresponding to subsample points having negative distances to "0", and the flowchart is done. Otherwise, if the triangle is not above the edge, step 836 sets the mask bits corresponding to subsample points having negative distances to "1". Step 836 also sets the mask bits corresponding to subsample points having non-negative distances to "0", and the flowchart is done.

Figure 8C:
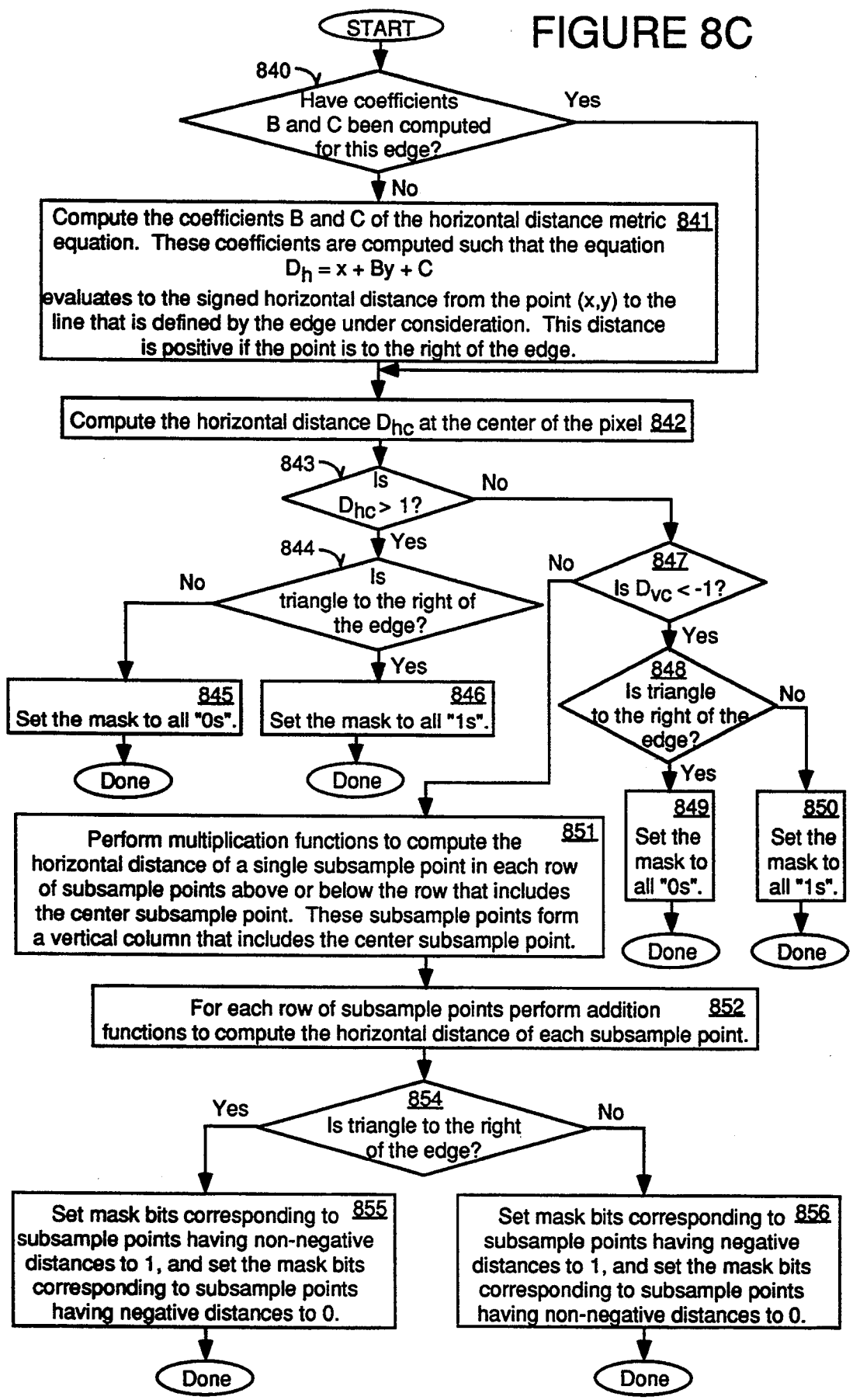
FIG. 8C shows a more detailed flowchart describing the steps for generating point sample masks using horizontal distance.

FIG. 8C shows a more detailed flowchart describing the steps for computing a horizontal distance mask. In step 840, a determination is made as to whether the coefficients B and C have been computed for the edge under consideration. If not, then the coefficients B and C are computed for the horizontal distance metric equation, step 841. These coefficients are computed such that the equation $D_h = x + By + C$ evaluates to the signed horizontal distance from the point (x,y) to the line that is defined by the edge under consideration. This distance is positive if the point is to the right of the edge. Next, step 842 is executed. If it has been determined in step 840 that these coefficients had previously been calculated for this edge, then step 841 is skipped and the flow proceeds to step 842.

In step 842, the horizontal distance $D_{hc}$ is computed for the pixel center. A determination is made in step 843 as to whether $D_{hc}$ is greater than 1. If so, step 844 determines whether the triangle is to the right of the edge. If the triangle is to the right of the edge, the mask is set to all 1's, step 846, and this flowchart is done. If the triangle is not to the right of the edge, the mask is set to all 0's, step 845, and this flowchart is done.

If it is determined in step 843 that $D_{hc}$ is not greater than 1, a determination is then made as to whether $D_{hc}$ is less than $-1$, step 847. If so, step 848 determines whether the triangle is to the right of the edge. If the triangle is to the right of the edge, the mask is set to all 0's in step 849, and this flowchart is done. If the triangle is not to the right of the edge, the mask is set to all 1's in step 850, and this flowchart is done.

If it is determined in step 847 that $D_{hc}$ is not less than $-1$, further computations are required to determine which samples are to the right and which are to the left of the edge. In step 851, multiplication functions are performed to compute the horizontal distance of a single subsample point in each row of subsample points above or below the row that includes the center subsample point. These subsample points form a vertical column that includes the center subsample point. Next, addition functions are performed to compute the horizontal distance of each subsample point for each row of subsample points, step 852.

A determination is made as to whether the triangle is to the right of the edge in step 854. If the triangle is to the right of the edge, step 855 sets the mask bits corresponding to subsample points having non-negative distances to "1". Step 855 also sets the mask bits corresponding to subsample points having negative distances to "0", and the flowchart is done. Otherwise, if the triangle is not to the right of the edge, step 856 sets the mask bits corresponding to subsample points having negative distances to "1". Step 856 also sets the mask bits corresponding to subsample points having non-negative distances to "0", and the flowchart is done.

An Example of a Point Sample Mask Generation

Figure 9A:
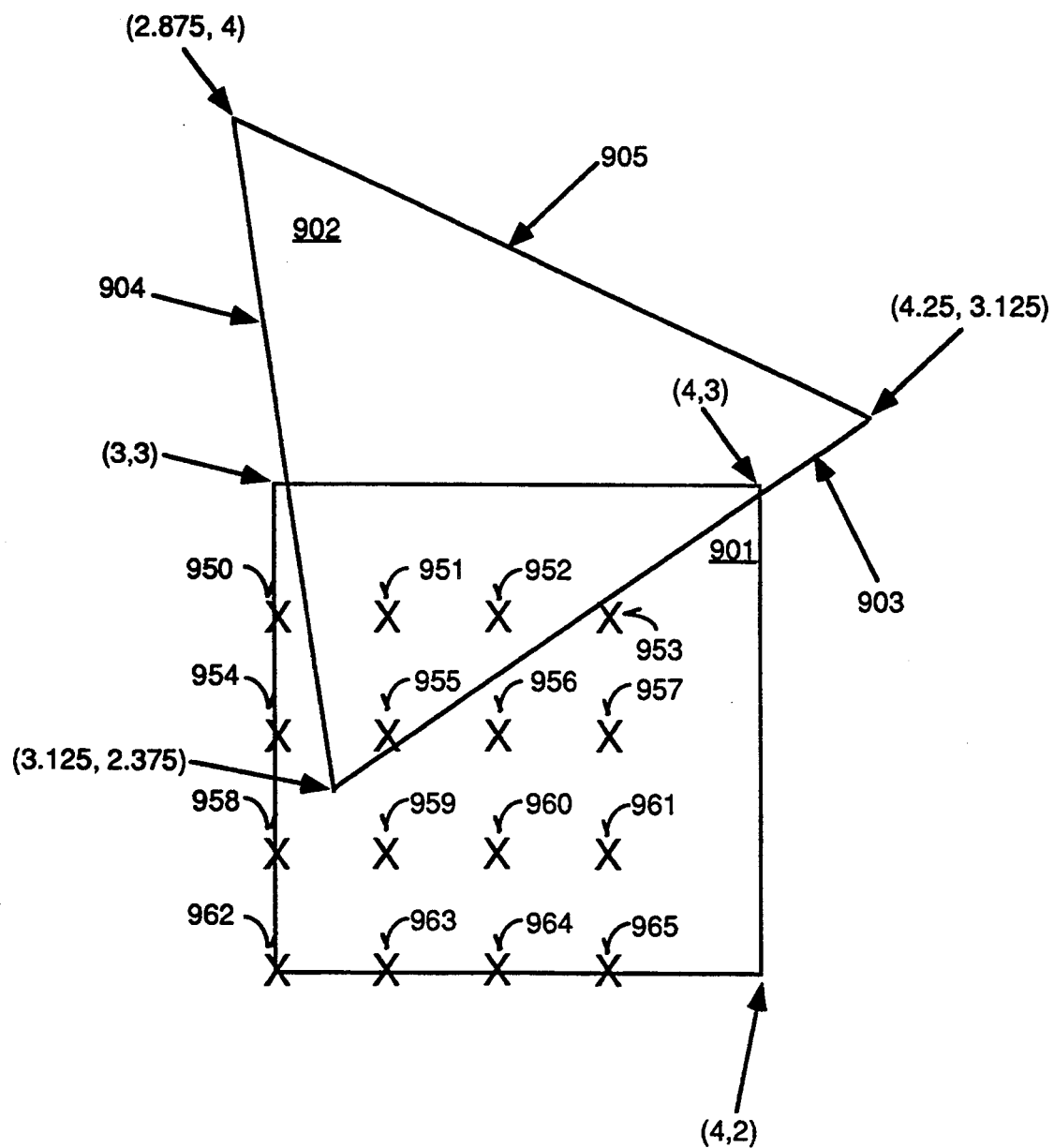
FIG. 9A shows the intersection of a pixel having a regular array of subsample points with a triangular polygon.

An example of how a point sample mask for a single pixel is generated will now be described in detail. Referring to FIG. 9A, a unit-square pixel 901 is shown in reference to a triangle 902. The four vertices of pixel 901 are given as: (3, 2), (3, 3), (4, 3), and (4,2). The point sample mask is comprised of a 4×4 array of subsample points 950–965. Subsample point 956 is designated as the approximate "center" subsample point. Triangle 902 is comprised of three edges: a first edge 903, a second edge 904, and a third edge 905. These three edges form three vertices at: (3.125, 2.375); (2.875, 4); and (4.25, 3.125).

Figures 9B, 9C:
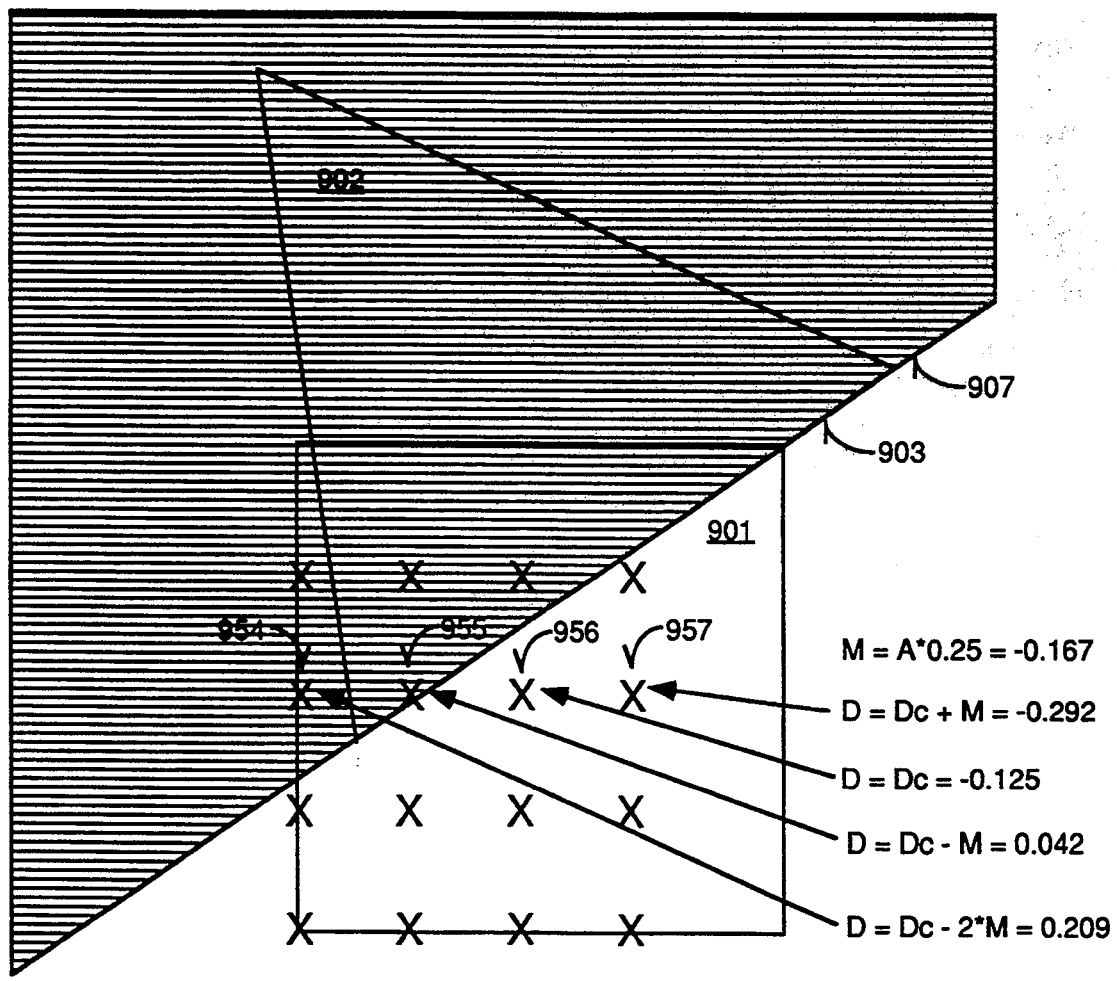
FIG. 9B shows an example of a first edge of a triangle in relation to a point sample mask of a pixel.
FIG. 9C shows a mask generated corresponding to the first edge of the triangle.

First, a mask is calculated corresponding to the half-plane defined by the first edge 903, as shown in FIG. 9B. The two vertices of triangle 902 defining the first edge are chosen as two points {(x0=4.250, y0=3.125), (x1=3.125, y1=2.375)} residing on the half-plane edge 907. Hence, the slope of half-plane edge 907 can be calculated:

$$\text{Slope} = (y1-y0)/(x1-x0) = 0.667$$

Since the slope is between the range of $-1$ and $+1$, the vertical distance equation is applied. This yields the following coefficients:

$$A = (y0-y1)/(x1-x0) = -0.667$$

$$C = ((x0*y1)-(x1*y0))/(x1-x0) = -0.292$$

Next, the vertical distance metric Dvc corresponding to the "center" subsample point 956 is computed as shown below. Center subsample point 956 has coordinates of (3.5, 2.5).

$$xc = 3.5$$

$$yc = 2.5$$

$$D_{vc} = (A*xc) + yc + C = -0.125$$

Since Dvc is between $-1$ and 1, the first edge 903 might pass through pixel 901. Thus, more extensive calculations for the subsample vertical distances are required.

First, the multiplication factor M is computed as $M = A*0.25 = -0.167$. Based on this multiplication factor, the vertical distances for a row of subsample points 954–957 are determined as follows:

$$D_{954} = D_{vc} - 2*M = 0.209$$

$$D_{955} = D_{vc} - M = 0.042$$

$$D_{956} = D_{vc} = -0.125$$

$$D_{957} = D_{vc} + M = -0.292$$

Next, a column of subsample points is calculated corresponding to each of these four subsample points in the row. For those pixels above the row, 0.25 is added; for those pixels one step below the row, 0.25 is subtracted; and for those pixels two steps below the row, 0.5 is subtracted. This produces sixteen vertical distance metrics as shown in Table 1 below.

TABLE 1

| offset | $D_y$ For Each Subsample Point | | | |
|---|---|---|---|---|
| $+\frac{1}{4}$ | 0.459 | 0.292 | 0.125 | −0.042 |
| 0 | 0.209 | 0.042 | −0.125 | −0.292 |
| $-\frac{1}{4}$ | −0.041 | −0.208 | −0.375 | −0.542 |
| $-\frac{1}{2}$ | −0.291 | −0.458 | −0.625 | −0.792 |

FIG. 9C shows a mask 911 which is based on the signs of the respective vertical distance metrics calculated above. It can be seen that a "1" is assigned to those subsample points having a positive vertical distance metric, and a "0" is assigned to those subsample points having a negative vertical distance metric. These assignments would have been reversed if triangle 903 had been below half-plane edge 907.

Figure 9D:
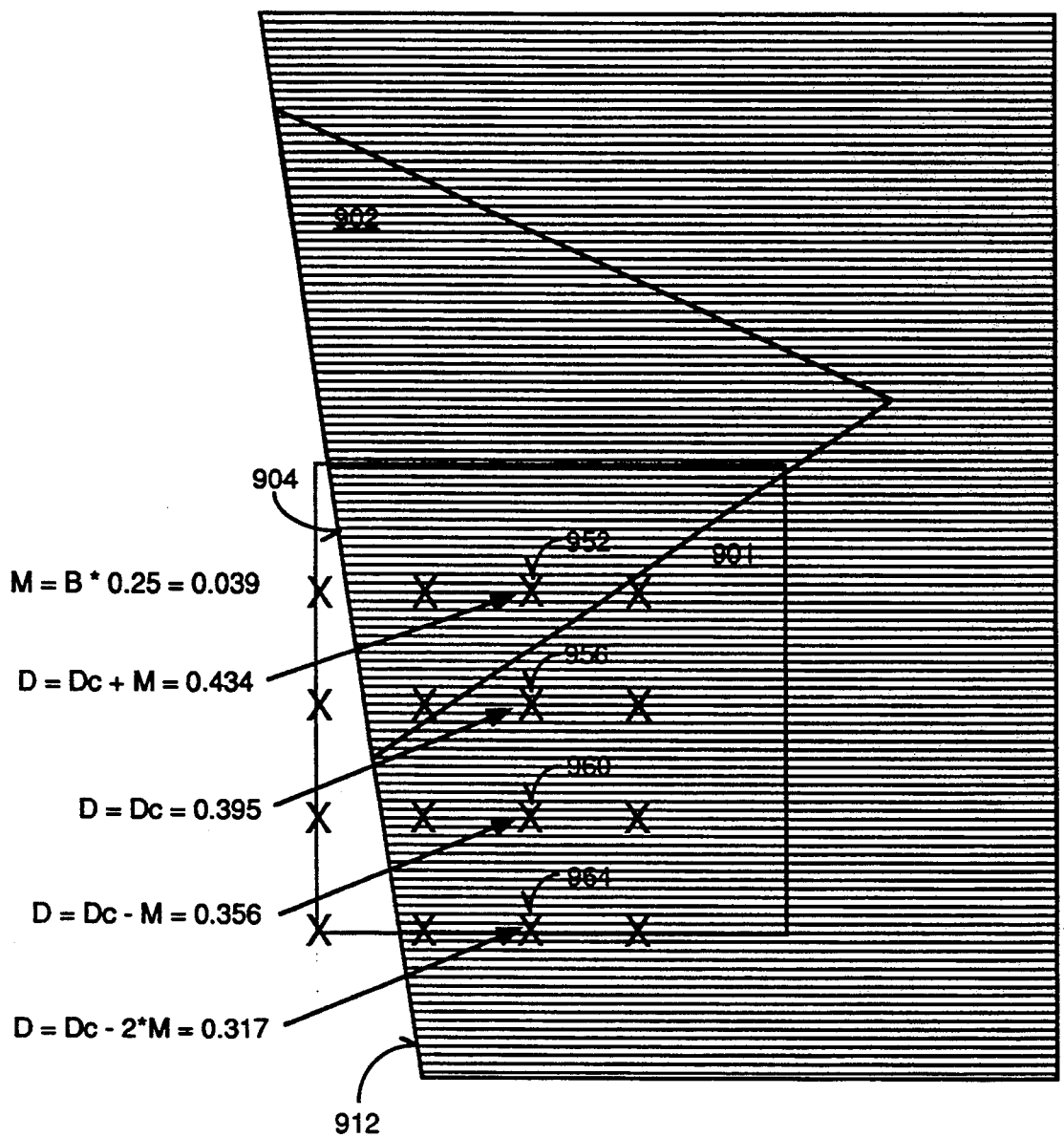
FIG. 9D shows an example of a second edge of a triangle in relation to a point sample mask of a pixel.

Next, a mask is calculated corresponding to the half-plane defined by the second edge 904, as shown in FIG. 9D. The two vertices of triangle 902 defining the second edge are chosen as two points {(x0=3.125, y0=2.375), (x1=2.875, y1=4.000)} residing on the half-plane edge 912. Hence, the slope of half-plane edge 912 can be calculated:

$$\text{Slope} = (y1-y0)/(x1-x0) = -6.500$$

Since the slope is not between the range of $-1$ and $+1$, the horizontal distance equation is applied. This yields the following coefficients:

$$B = (x0-x1)/(y1-y0) = 0.154$$

$$C = ((x1*y0)-(x0*y1))/(y1-y0) = -3.490$$

Next, the horizontal distance metric Dhc corresponding to the "center" subsample point 956 is computed as shown below. Center subsample point 956 has coordinates of (3.5, 2.5).

$$xc = 3.5$$

$$yc = 2.5$$

$$D_{hc} = xc + (B*yc) + C = 0.395$$

Since Dhc is between $-1$ and 1, the second edge 904 might pass through pixel 901. Thus, more extensive calculations for the subsample horizontal distances are required.

This entails calculating the multiplication factor $M = B*0.25 = 0.039$. Based on this multiplication factor, the horizontal distances for a column of subsample points 952, 956, 960, and 964 are determined as follows:

$$D_{952} = D_{hc} + M = 0.434$$

$$D_{956} = D_{hc} = 0.395$$

$$D_{960} = D_{hc} - M = 0.356$$

$$D_{964} = D_{hc} - 2*M = 0.317$$

Next, a row of subsample points is calculated corresponding to each of these four subsample points in the column. For those pixels to the right of the row, 0.25 is added; for those pixels one step to the left of the row, 0.25 is subtracted; and for those pixels two steps to the left of the row, 0.5 is subtracted. This produces sixteen horizontal distance metrics as shown in Table 2 below.

TABLE 2

| Offset: | $-\frac{1}{2}$ | $-\frac{1}{4}$ | 0 | $+\frac{1}{4}$ |
|---|---|---|---|---|
| $D_h$ For Each Subsample Point | −0.066 | 0.184 | 0.434 | 0.684 |
| | −0.105 | 0.145 | 0.395 | 0.645 |
| | −0.144 | 0.106 | 0.356 | 0.606 |
| | −0.183 | 0.067 | 0.317 | 0.567 |

Figure 9E:
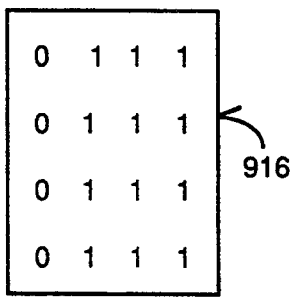
FIG. 9E shows a mask generated corresponding to the second edge of the triangle.

FIG. 9E shows a mask 916 which is based on the signs of the respective horizontal distance metrics calculated above. A "1" is assigned with those subsample points having a positive horizontal distance metric, and a "0" is assigned to those subsample points having a negative horizontal distance metric.

A mask is also calculated corresponding to the half-plane defined by the third edge 905, as shown in FIG. 9F. The two vertices of triangle 902 defining the third edge are chosen as two points {(x0=2.875, y0=4.000), (x1=4.250, y1=3.125)} residing on the half-plane edge 917. Hence, the slope of half-plane edge 917 can be calculated:

$$\text{Slope} = (y1-y0)/(x1-x0) = -0.636$$

Since the slope is between the range of $-1$ and $+1$, the vertical distance equation is applied. This yields the following coefficients:

$$A = (y0-y1)/(x1-x0) = 0.636$$

$$C = ((x0*y1)-(x1*y0))/(x1-x0) = -5.830$$

Next, the vertical distance metric Dvc corresponding to the "center" subsample point 956 is computed as shown below.

$$D_{vc} = (A*xc) + yc + C = -1.104$$

Since Dvc is less than $-1$, the entire pixel is below the third edge 905. Furthermore, since triangle 902 is also below the third edge 905, the mask 918 is all 1's, as shown in FIG. 9G.

Finally, the three masks are merged by performing AND operations, as shown in FIG. 9H. In other words, performing AND operations on masks 911, 916, and 918 corresponding to the three edges, results in a final mask 919. As an example, consider the top-left most subample point. The result of 1 AND 0 AND 1 is 0. The final mask is comprised of subsample mask values 913, 920, and 921 having 1's, while the other subsample mask values have 0's. Referring back to FIG. 9A, it can be seen that the subsample points 952, 951, and 955, corresponding to subsample mask values 913, 920, and 92 1, reside within triangle 902, whereas the other subsample points reside outside of triangle 902. This inside/outside status is correctly and accurately portrayed by the final mask 919.

Alternative Embodiments

The present invention can be implemented as a hardware state machine, as a semi-custom ASIC(s), or as a computer implemented software program. Furthermore, the present invention can be embedded in any rasterization system that uses point sampled mask generation.

In an alternative embodiment, a table can be used to replace the additive portion of the calculation of sub-pixel distances. The same table can be used for both vertical and horizontal distances. For example, Table 3 below can be applied to the 4×4 array of the example described above.

TABLE 3

| D = bbbbbbbbbbbb.bbbbbbbbbbbb | | | |
|---|---|---|---|
| ↓↓↓↓ $-\frac{1}{2}$ | $-\frac{1}{4}$ | 0 | $+\frac{1}{4}$ |
| 01.11 1 | 1 | 1 | 1 |
| 01.10 1 | 1 | 1 | 1 |
| 01.01 1 | 1 | 1 | 1 |
| 01.00 1 | 1 | 1 | 1 |
| 00.11 1 | 1 | 1 | 1 |
| 00.10 1 | 1 | 1 | 1 |
| 00.01 0 | 1 | 1 | 1 |
| 00.00 0 | 0 | 1 | 1 |
| 11.11 0 | 0 | 0 | 1 |

TABLE 3-continued

| D = bbbbbbbbbbbb.bbbbbbbbbbbb | | | | |
|---|---|---|---|---|
| ↓↓↓↓ | −¾ | −¼ | 0 | +¼ |
| 11.10 | 0 | 0 | 0 | 0 |
| 11.01 | 0 | 0 | 0 | 0 |
| 11.00 | 0 | 0 | 0 | 0 |
| 10.11 | 0 | 0 | 0 | 0 |
| 10.10 | 0 | 0 | 0 | 0 |
| 10.01 | 0 | 0 | 0 | 0 |
| 10.00 | 0 | 0 | 0 | 0 |

This sixteen-entry table is indexed using four bits of the binary representation distance (either vertical or horizontal). The necessary bits include the two bits to the left of the binary point and the two bits to the right of the binary point. Table 3 shows four outputs: one for the subsample point that is ¼ pixel below (or to the left) of the center subsample point, one for the subsample point that is ¼ pixel below (or to the left) of the center subsample point, one for the center subsample point, and one for the subsample point that is ¼ pixel above (or to the right) of the center subsample point.

Referring back to the first edge given in the example given above, the four distance values computed by multiplication and addition are shown in Table 4 below.

TABLE 4

| Sample Offset | Vertical Distance | Binary Representation of Vertical Distance | Table Index | Table Output |
|---|---|---|---|---|
| −¾: | $D = D_{vc} - 2*M = 0.209$ | = 0000000000.001101010101 | 00.00 | 0011 |
| −¼: | $D = D_{vc} - M = 0.042$ | = 0000000000.000010101010 | 00.00 | 0011 |
| 0: | $D = D_{vc} = -0.125$ | = 1111111111.111000000000 | 11.11 | 0001 |
| +¼: | $D = D_{vc} + M = -0.292$ | = 1111111111.101101010101 | 11.10 | 0000 |

It can be seen that rotating the table output 90 degrees counter-clockwise (to account for the fact that the table output is to be used as columns), generates the same mask as was computed in the example given above. Note that the table output would have been inverted if the triangle had been on the negative distance side of the first edge.

In another alternative embodiment, it is not necessary to check for complete or zero coverage. Instead, the distance metric is computed for each subsample location. This eliminates the comparison logic for complete or zero coverage determinations, but substantially increases the logic for subsample computation. Furthermore, by modifying the complete or zero coverage test, the subsamples need not be constrained to be within the bounding box of a pixel.

In yet another alternative embodiment, the number of rows and columns of subsample points for any given mask need not be the same. Moreover, the signs of the distance metrics can be changed by carrying the changes in the signs throughout the computations described above. In addition, the interpretation of zero-valued distances can be changed, as long as the result is consistent for polygons that share a common edge. Also, the intermediate value M need not be computed. The initial distances for each row or column can be computed directly. Also, the directions and origin of the coordinate system can be changed if corresponding changes are made to the equations and conditions. Finally, the present invention will correctly generate masks of all 0's for pixels outside of the triangle. Thus, it is not necessary to consider only those pixels which are wholly inside or partially inside the triangle.

Thus, an apparatus and method for generating point sample masks in a computer graphics system is described.

What is claimed is:

1. In a computer system, a computer implemented method of generating a point sample mask having an array of sample points corresponding to a pixel, wherein each sample point has associated information specifying whether said sample point is inside or outside a polygon, said information being used for rendering said pixel for display by said computer system, said method comprising the steps of:

generating a first mask corresponding to a first edge of said polygon, said first mask specifying which ones of a first set of said sample points reside within a first half-plane defined by said first edge, wherein a sign of a vertical or horizontal distance metric corresponding to a first sample of said first set of sample points determines whether said first sample resides within said first half-plane;

generating a second mask corresponding to a second edge of said polygon, said second mask specifying which ones of a second set of sample points reside within a second half-plane defined by said second edge, wherein a sign of a vertical or horizontal distance metric corresponding to a second sample of said second set of sample points determines whether said second sample resides within said second half-plane;

generating a third mask corresponding to a third edge of said polygon, said third mask specifying which ones of a third set of sample points reside within a third half-plane defined by said third edge, wherein a sign of a vertical or horizontal distance metric corresponding to a third sample of said third set of sample points determines whether said third sample resides within said third half-plane;

merging said first mask, said second mask, and said third mask to generate said point sample mask.

2. The method of claim 1 further comprising the steps of:

determining whether a slope of said first edge is within a range of +1 to −1;

generating coefficients of said vertical distance metric if said slope is within said range;

generating coefficients of said horizontal distance metric if said slope is not within said range.

3. The method of claim 2 further comprising the step of interpolating vertical distance metrics for a row of sample points by performing a plurality of multiplication functions if said slope is within said range.

4. The method of claim 2 further comprising the step of interpolating vertical distance metrics for a column of sample points by performing a plurality of addition functions if said slope is within said range.

5. The method of claim 2 further comprising the step of interpolating horizontal distance metrics for a column of sample points by performing a plurality of multiplication functions if said slope is not within said range.

6. The method of claim 2 further comprising the step of interpolating horizontal distance metrics for a row of sample points by performing a plurality of addition functions if said slope is not within said range.

7. The method of claim 2, wherein said vertical distance metric is derived from:

$$Dv = Ax + y + C,$$

where:
- $Dv$ = distance value in pixel widths for a subsample point directly to the left or right of a pixel centerpoint;
- $A = (y_1 - y_0)/(x_1 - x_0$;
- $C = (2x_0 y_0 - x_0 y_1 - x_1 y_0)/(x_1 - x_0)$;
- $(x_0, y_0)$ and $(x_1, y_1)$ = coordinate corresponding to two vertices that define said first edge.

8. The method of claim 2, wherein a first horizontal distance metric is derived from:

$$Dh = x + By + C,$$

where:
- $Dh$ = distance value in pixel widths for a subsample point directly above or below a pixel centerpoint;
- $B = (x0 - x1)/(y1 - y0)$;
- $C = ((x1*y0) - (x0*y1)/(y1 - y0)$;
- $(x_0, y_0)$ and $(x_1, y_1)$ = coordinate corresponding to two vertices that define said first edge.

9. The method of claim 8 further comprising the step of determining inside/outside status for each of said sample points by examining a sign of each corresponding vertical distance metric if said slope is within said range.

10. The method of claim 9 further comprising the step of determining inside/outside status for each of said sample points by examining a sign of each corresponding horizontal distance metric if said slope is not within said range.

11. The method of claim 10, wherein said merging step is accomplished by performing AND operations for each corresponding sample point of said first mask, said second mask, and said third mask.

12. The method of claim 11, wherein said array is comprised of an 8×8 matrix of sample points.

13. The method of claim 12, wherein said interpolating steps are accomplished by a table lookup.

14. In a computer system, an apparatus for generating a point sample mask having an array of sample points corresponding to a pixel, wherein each sample point has associated information specifying whether said sample point is inside or outside a polygon, said information being used for rendering said pixel for display by said computer system, said apparatus comprising:
- a first generator for generating a first mask corresponding to a first edge of said polygon, said first mask specifying which ones of a first set of said sample points reside within a first half-plane defined by said first edge, wherein a sign of a vertical or horizontal distance metric corresponding to a first sample of said first set of sample points determines whether said first sample resides within said first half-plane;
- a second generator coupled to said first generator for generating a second mask corresponding to a second edge of said polygon, said second mask specifying which ones of a second set of sample points reside within a second half-plane defined by said second edge, wherein a sign of a vertical or horizontal distance metric corresponding to a second sample of said second set of sample points determines whether said second sample resides within said second half-plane;
- a third generator coupled to said second generator for generating a third mask corresponding to a third edge of said polygon, said third mask specifying which ones of a third set of sample points reside within a third half-plane defined by said third edge, wherein a sign of a vertical or horizontal distance metric corresponding to a third sample of said third set of sample points determines whether said third sample resides within said third half-plane;
- a circuit coupled to said first, said second, and said third generators for merging said first mask, said second mask, and said third mask, resulting in said point sample mask.

15. The apparatus of claim 14 further comprising:
- a means for determining whether a slope of said edge is within a range of +1 to −1;
- a means for generating coefficients of said vertical distance metric if said slope is within said range;
- a means for generating coefficients of said horizontal distance metric if said slope is not within said range.

16. The apparatus of claim 15 further comprising a multiplier for interpolating vertical distance metrics for a row of sample points if said slope is within said range.

17. The apparatus of claim 16 further comprising an adder for interpolating vertical distance metrics for a column of sample points if said slope is within said range.

18. The apparatus of claim 17 further comprising a multiplier for interpolating horizontal distance metrics for a column of sample points if said slope is not within said range.

19. The apparatus of claim 18 further comprising an adder for interpolating horizontal distance metrics for a row of sample points if said slope is not within said range.

20. The apparatus of claim 19, wherein a first vertical distance metric is derived from:

$$Dv = Ax + y + C,$$

where:
- $Dv$ = distance value in pixel widths for a subsample point directly to the left or right of a pixel centerpoint;
- $A = (y_1 - y_0)/(x_1 - x_0$;
- $C = (2x_0 y_0 - x_0 y_1 - x_1 y_0)/(x_1 - x_0)$;
- $(x_0, y_0)$ and $(x_1, y_1)$ = coordinate corresponding to two vertices that define said first edge.

21. The apparatus of claim 20, wherein a first horizontal distance metric is derived from:

$$Dh = x + By + C,$$

where:
- $Dh$ = distance value in pixel widths for a subsample point directly above or below a pixel centerpoint;
- $B = (x0 - x1)/(y1 - y0)$;
- $C = ((x1*y0) - (x0*y1)/(y1 - y0)$;
- $(x_0, y_0)$ and $(x_1, y_1)$ = coordinate corresponding to two vertices that define said first edge.

22. The apparatus of claim 21 further comprising a means for determining inside/outside status for each of said sample points by examining a sign of each corresponding vertical distance metric if said slope is within said range.

23. The apparatus of claim 22 further comprising a means for determining inside/outside status for each of said sample points by examining a sign of each corresponding horizontal distance metric if said slope is not within said range.

24. The apparatus of claim 23 further comprising an AND circuit for performing AND operations on each corresponding sample point of said first mask, said second mask, and said third mask to produce said point sample mask.

25. The apparatus of claim 24, wherein said array is comprised of an 8×8 matrix of sample points.

26. The apparatus of claim 25 further comprising a table lookup for performing said interpolation.

* * * * *